US011864159B2

(12) United States Patent
Lu et al.

(10) Patent No.: US 11,864,159 B2
(45) Date of Patent: Jan. 2, 2024

(54) SIDELINK COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 437 days.

(21) Appl. No.: 17/144,680

(22) Filed: Jan. 8, 2021

(65) Prior Publication Data

US 2021/0127363 A1    Apr. 29, 2021

Related U.S. Application Data

(63) Continuation of application No. PCT/CN2019/096462, filed on Jul. 18, 2019.

(30) Foreign Application Priority Data

Jul. 18, 2018   (CN) .......................... 201810792825.X (51) Int. Cl.
*H04W 72/02*     (2009.01)
*H04W 72/04*     (2023.01)

(52) U.S. Cl.
CPC ........... *H04W 72/02* (2013.01); *H04W 72/04* (2013.01)

(58) Field of Classification Search
CPC . H04W 72/0453; H04W 74/16; H04W 72/02; H04W 72/04
See application file for complete search history.

(56) References Cited

U.S. PATENT DOCUMENTS

| 11,641,679 | B2 * | 5/2023 | Zhang ............... H04W 72/0453 |
| | | | 370/329 |
| 2015/0009910 | A1 | 1/2015 | Ryu et al. |
| 2018/0227943 | A1 * | 8/2018 | Xiao ..................... H04W 76/14 |
| 2018/0227971 | A1 | 8/2018 | Yasukawa et al. |
| 2020/0077433 | A1 * | 3/2020 | Lin .................. H04W 72/0446 |
| 2020/0228283 | A1 * | 7/2020 | Cai ........................... H04L 5/26 |

(Continued)

FOREIGN PATENT DOCUMENTS

| CN | 104349479 | 2/2015 |
| CN | 108024230 | 5/2018 |
| EP | 3451737 | 3/2019 |

(Continued)

OTHER PUBLICATIONS

CNIPA, Second Office Action for CN Application No. 201980047546. 3, dated Jul. 20, 2022.

(Continued)

*Primary Examiner* — Raj Jain
(74) *Attorney, Agent, or Firm* — Hodgson Russ LLP (57) ABSTRACT

A sidelink communication method includes: obtaining, by a first terminal device, at least one frequency domain resource of the first terminal device which is used for sidelink communication; and determining, by the first terminal device, a first frequency domain resource from the at least one frequency domain resource.

18 Claims, 4 Drawing Sheets

(56) References Cited

U.S. PATENT DOCUMENTS

2021/0127363 A1* 4/2021 Lu .................. H04W 72/04

FOREIGN PATENT DOCUMENTS

| EP | 3478010 | | 5/2019 |
|----|---------|---|--------|
| EP | 3547778 | | 10/2019 |
| WO | 2017026543 | | 2/2017 |
| WO | 2017193380 | | 11/2017 |
| WO | 2018027989 | | 2/2018 |
| WO | 2018053719 | A1 | 3/2018 |
| WO | 2018128372 | | 7/2018 |

OTHER PUBLICATIONS

WIPO, ISR and WO for PCT/CN2019/096462, Oct. 9, 2019.
Ericsson, "Clarification to Mapping Between Service Types and V2X Frequencies," 3GPP TSG-RAN WG2 #100, Tdoc R2-1713510, Nov. 2017.
ZTE, "Discussion on carrier selection in PC5 CA," 3GPP TSG-RAN WG2 Meeting #100, R2-1713070, Nov. 2017.
CNIPA, First Office Action for CN Application No. 201980047546.3, dated Mar. 16, 2022.
EPO, Extended European Search Report for EP Application No. 19837390.4, dated Mar. 18, 2022.

* cited by examiner

SIDELINK COMMUNICATION METHOD, TERMINAL DEVICE AND NETWORK DEVICE

CROSS-REFERENCE

This application is a continuation of International Application No. PCT/CN2019/096462, filed Jul. 18, 2019, which claims priority to Chinese Patent Application No. 201810792825.X, filed Jul. 18, 2018, the entire disclosures of which are incorporated herein by reference.

TECHNICAL FIELD

The embodiments of the present application relate to the field of communication technologies, and particularly to a sidelink communication method, a terminal device, and a network device.

BACKGROUND

In related art, a minimum bandwidth supported by a terminal in a system for Internet of Vehicles can be 5 MHz and a maximum bandwidth can be 400 MHz. If all terminals are required to support the maximum 400 MHz, there will be high requirements on the performance of the terminals, which is not conducive to reducing the cost of the UE. At the same time, a terminal cannot occupy the entire 400 M bandwidth at the same time. If the terminal uses a sampling rate corresponding to the 400 M bandwidth, there is also a waste of performance.

SUMMARY

According to a first aspect, there is provided a sidelink communication method, including: obtaining, by a first terminal device, at least one frequency domain resource of the first terminal device which is used for sidelink communication; and determining, by the first terminal device, a first frequency domain resource from the at least one frequency domain resource.

According to a second aspect, there is provided a sidelink communication method, including: determining, by a network device, at least one frequency domain resource of a first terminal device which is used for sidelink communication; and transmitting, by the network device, first indication information to the first terminal device, the first indication information being used for indicating the at least one frequency domain resource.

According to a third aspect, there is provided a terminal device which is configured to perform the method in the above first aspect or the implementations thereof.

Specifically, the terminal device includes a functional module configured to perform the method in the above first aspect or the implementations thereof.

According to a fourth aspect, there is provided a network device configured to perform the method in the second aspect or the implementations thereof.

Specifically, the network device includes a functional module configured to perform the method in the above second aspect or the implementations thereof.

According to a fifth aspect, there is provided a terminal device including a processor and a memory. The memory is used for storing a computer program, and the processor is configured to invoke and run the computer program stored in the memory to perform the method in the above-mentioned first aspect or the implementations thereof.

According to a sixth aspect, there is provided a network device including a processor and a memory. The memory is used for storing a computer program, and the processor is configured to invoke and run the computer program stored in the memory to perform the method in the above-mentioned second aspect or the implementations thereof.

According to a seventh aspect, there is provided a chip which is used to implement the method in any one of the above first to second aspects or the implementations thereof.

Specifically, the chip includes a processor configured to invoke and run a computer program from a memory, so that a device installed with the chip performs the method in any one of the above first to the second aspects or the implementations thereof.

According to an eighth aspect, there is provided a computer-readable storage medium for storing a computer program that causes a computer to perform the method in any one of the first to the second aspects or the implementations thereof.

According to a ninth aspect, there is provided a computer program product including computer program instructions that cause a computer to perform the method in any one of the first to the second aspects or the implementations thereof.

According to a tenth aspect, there is provided a computer program which, when running on a computer, causes the computer to perform the method in any one of the above first to the second aspects or the implementations thereof.

DETAILED DESCRIPTION

Technical solutions in embodiments of the present disclosure are described below in connection with the accompanying drawings in the embodiments of the present disclosure. Obviously, the described embodiments are part of the embodiments of the present disclosure, but not all the embodiments. Based on the embodiments in the present disclosure, all other embodiments obtained by a person of ordinary skill in the art without creative work fall within the protection scope of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Universal Mobile Telecommunication System (UMTS), a Global Interoperability for Microwave Access (WiMAX) communication system, a 5G system, or the like.

For example, the communication system to which in the embodiments of the present application are applied can include a network device, and the network device can be a device that communicates with a terminal device (or referred to as a communication terminal or a terminal). The network device can provide communication coverage for a specific geographic area, and can communicate with terminal devices located in the coverage area. Optionally, the network device can be a Base Transceiver Station (BTS) in a GSM system or a CDMA system, a NodeB (NB) in a WCDMA system, an Evolutional Node B (eNB or eNodeB), or a wireless controller in a Cloud Radio Access Network (CRAN), or the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system to which the embodiments of the present application are applied further includes at least one terminal device located within the coverage area of the network device. As used herein, "terminal device" includes, but is not limited to, User Equipment (UE), an access terminal, a user unit, a user station, a moving station, a mobile station, a remote station, a remote terminal, a mobile device, a user terminal, a terminal, a wireless communication device, a user agent or a user device. The access terminal can be a cellular phone, a cordless phone, a Session Initiation Protocol (SIP) phone, a Wireless Local Loop (WLL) station, a personal digital assistant (PDA), a handheld device with a wireless communication function, a computing device or other processing devices connected to a wireless modem, an on-board device, a wearable device, a terminal device in the future 5G network, a terminal device in a future evolutional Public Land Mobile Network (PLMN), or the like, which are not limited in the embodiments of the present application.

Optionally, the 5G system or 5G network may also be referred to as a New Radio (NR) system or NR network.

Figure 1:
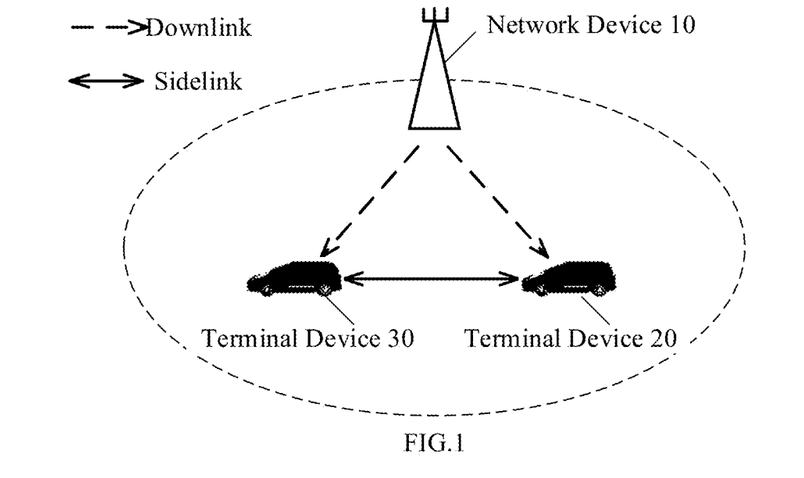
FIG. 1 is a schematic diagram of a sidelink communication system according to an embodiment of the present application.
Figure 2:
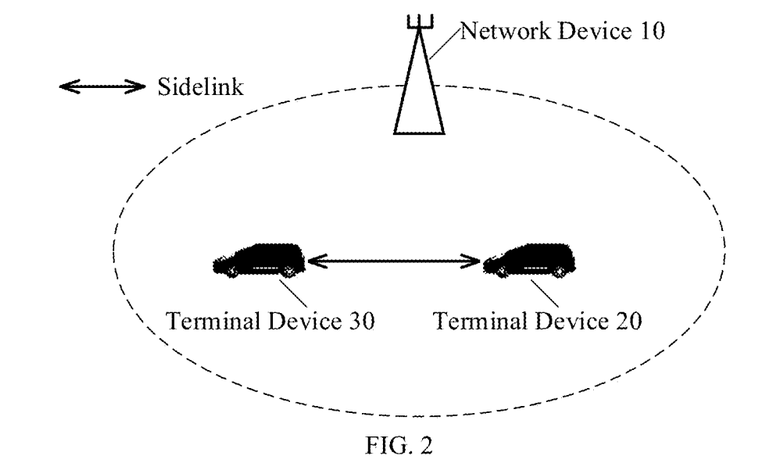
FIG. 2 is a schematic diagram of a sidelink communication system according to an embodiment of the present application.

Optionally, Device to Device (D2D) communication can be performed between terminal devices. D2D communication is a Sidelink (SL) transmission technology, which is different from the traditional LTE system in the manner of receiving or transmitting communication data through a base station. The system for Internet of Vehicles adopts the D2D direct communication, and thus has a higher spectrum efficiency and lower transmission delay. For example, FIG. 1 and FIG. 2 are schematic diagrams of an application scenario of embodiments of the present application, in which a network device and two terminal devices are exemplarily shown. Optionally, the wireless communication system can include multiple network devices and other numbers of terminal devices can be included within the coverage range of each of the network devices, which are not limited in the embodiments of the present application. In addition, the wireless communication system can also include other network entities such as a Mobile Management Entity (MME), a Serving Gateway (S-GW), a Packet Data Network Gateway (P-GW) and so on, which are not limited in the embodiments of the present application.

Specifically, a terminal device 20 and a terminal device 30 can communicate with each other in a D2D communication mode. When performing the D2D communication, the terminal device 20 and the terminal device 30 directly communicate with each other through a D2D link, that is, a sidelink. As shown in FIG. 1 or FIG. 2, the terminal device 20 and the terminal device 30 directly communicate with each other through the sidelink. In FIG. 1, the terminal device 20 and the terminal device 30 perform communication through the sidelink, and the transmission resources thereof are allocated by a network device 10. In FIG. 2, the terminal device 20 and the terminal device 30 perform communication through the sidelink, and the transmission resources thereof are independently selected by the terminal devices without allocation of the transmission resources by the network device.

The D2D communication mode can be applied to Vehicle to Vehicle (V2V) communication or Vehicle to Everything (V2X) communication. In V2X communication, X can generally refer to any device with wireless receiving and transmitting capability, such as but not limited to a slowly-moving wireless apparatus, a fast-moving vehicle-mounted device, or a network control node with the wireless transmitting and receiving capability. It should be understood that the embodiments of the present application are mainly applied to a V2X communication scenario, but can also be applied to any other D2D communication scenario, which is not limited in the embodiments of the present application.

Figure 3:
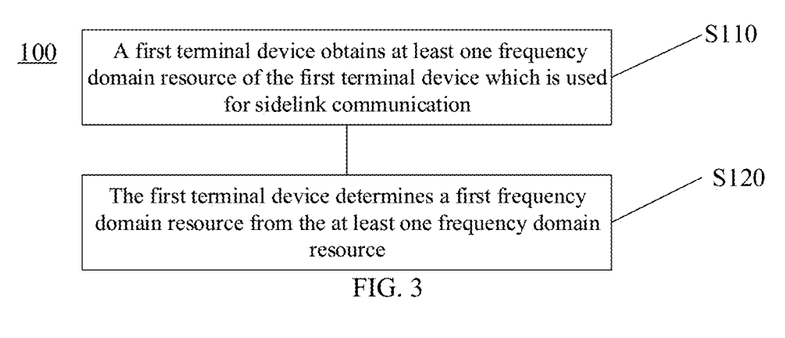
FIG. 3 is a schematic diagram of a sidelink communication method according to an embodiment of the present application.

FIG. 3 is a schematic diagram of a sidelink communication method 100 according to an embodiment of the present application. The method 100 can be performed by any terminal device as shown in FIG. 1 or FIG. 2. The method 100 includes some or all of the following steps.

In S110, a first terminal device obtains at least one frequency domain resource of the first terminal device which is used for sidelink communication.

In S120, the first terminal device determines a first frequency domain resource from the at least one frequency domain resource.

Therefore, in the sidelink communication method according to the embodiment of the present application, the sidelink frequency domain resource can be adjusted in real time by determining the frequency domain resource to be used from the at least one frequency domain resource, which is beneficial to the improvement of the performance of the sidelink communication.

Optionally, the frequency domain resource can be a Bandwidth Part (BWP), that is, the bandwidth adaptively changes.

In LTE, the bandwidth of the terminal device is consistent with the bandwidth of the system, and the bandwidth remains unchanged after being configured by decoding Master Information Block (MIB) information. In NR, the bandwidth of the terminal device can be changed dynamically. The BWP is explained with reference to FIG. 4 as an example. At a first timing, the terminal device has a large traffic volume, and the system configures the terminal device with a large bandwidth (BWP1); at a second timing, the terminal device has a small traffic volume, and the system configures the terminal device with a small bandwidth (BWP2) so as to meet a basic communication requirement; at a third timing, the system finds that there is a wide range of frequency selective fading in the bandwidth of BWP1, or that the resources in the frequency range of BWP1 are relatively scarce, and thus configures the terminal device with a new bandwidth (BWP3). The terminal device only needs to use a center frequency and a sampling rate of the corresponding BWP in the corresponding BWP. Moreover, each BWP is not only different in the frequency and the bandwidth, but can also corresponds to a different configuration. For example, a numerology of each BWP can be different. For example, a sub-carrier spacing, a Cyclic Prefix (CP) type, a Synchronization Signal Block (SSB) period and so on can be configured differently to adapt different services.

For a certain terminal device, there may be at least one sidelink transmission BWP or at least one sidelink reception BWP, and the terminal device can select a BWP from the at least one sidelink transmission BWP to perform sidelink transmission, and select a BWP from the at least one sidelink reception BWP to perform sidelink reception.

Optionally, the frequency domain resource may also be a carrier.

The technology for Internet of Vehicles is standardized in Rel-14 LTE, and a single carrier transmission is primarily standardized. In Rel-15 LTE, it is extended to a multi-carrier scenario, that is, one terminal device can perform transmission and reception on more than one carrier at the same time.

Similarly, for a certain terminal device, there may be at least one sidelink transmission carrier or at least one sidelink reception carrier, and the terminal device can select a carrier from the at least one sidelink transmission carrier to perform the sidelink transmission, and select a carrier from the at least one sidelink reception carrier to perform the sidelink reception.

Optionally, the frequency domain resource may also be other units that characterize the frequency domain resources, which is not limited in the embodiments of the present application.

Optionally, the at least one sidelink transmission frequency domain resource (the sidelink transmission BWP or sidelink transmission carrier) or the at least one sidelink reception frequency domain resource (the sidelink reception BWP or sidelink reception carrier) of the terminal device can be pre-configured in the terminal device, which can also be said that it is agreed by the agreement and is a factory default in the terminal device.

Optionally, the at least one sidelink transmission frequency domain resource (the sidelink transmission BWP or sidelink transmission carrier) or the at least one sidelink reception frequency domain resource (the sidelink reception BWP or sidelink reception carrier) of the terminal device can also be indicated by the network device, for example, can be configured by Radio Resource Control (RRC) or be indicated to the terminal device through a broadcast message.

Specifically, if the terminal device does not have a cellular network, it can select a corresponding frequency domain resource from the at least one sidelink transmission frequency domain resource or the at least one sidelink reception frequency domain resource which is pre-configured internally. If the terminal device has a cellular network, it can obtain the at least one sidelink transmission frequency domain resource or the at least one sidelink reception frequency domain resource from the information indicated by the network device, and select a corresponding frequency domain resource therefrom.

The terminal device can autonomously select a sidelink frequency domain resource from the obtained at least one sidelink frequency domain resource. The terminal device can also select the sidelink frequency domain resource from the obtained at least one sidelink frequency domain resource according to an instruction from the network device. For example, the terminal device can autonomously select the sidelink frequency domain resource based on current service information. By way of example, if the current service has a high requirement on the time, the terminal device can select the frequency domain resource with a relatively wide frequency domain range from the at least one sidelink frequency domain resource, and if the current service does not have the high requirement on the time, the terminal device can select the frequency domain resource with a relatively narrow frequency domain range from the at least one sidelink frequency domain resource. For another example, the terminal device can also receive Downlink Control Information (DCI) issued by the network device. The DCI indicates which frequency domain resource of the at least one sidelink frequency domain resource is to be used by the terminal device. It should be understood that the at least one sidelink frequency domain resource can be the sidelink transmission frequency domain resource(s) or the sidelink reception frequency domain resource(s).

Optionally, if the at least one sidelink frequency domain resource is configured by the network device, the terminal device may also report certain information of the terminal device to the network device prior to the configuration by the network device, so that the network device can configure the at least one sidelink frequency domain resource in combination with the certain information of the terminal device. For example, the terminal device may report to the network device the capability of the frequency domain resources it supports and/or service information of the terminal device. The capability of the frequency domain resources supported by the terminal device may be, for example, a maximum frequency domain range of the frequency domain resources supported by the terminal device, or the number of frequency domain resources that can be supported by the terminal device. The service information of the terminal device can be at least one of a Provider Service Identifier (PSID), a target address of the service, and Quality of Service (QoS) information, for example.

Optionally, indicating the at least one frequency domain resource or the first frequency domain resource to the terminal device by the network device can include indicating a time-frequency position of the frequency domain resource. For example, a starting position of the frequency domain resource in the time domain and time domain units included therein can be indicated.

Optionally, the network device can configure the sidelink frequency domain resources for multiple terminal devices, respectively, and can further indicate the same by way of broadcasting or the like. After receiving the broadcast message, a certain terminal device can select its own sidelink frequency domain resource. Different terminal devices among the multiple terminal devices may have the capability of supporting different frequency domain resources. For example, the network device can classify the multiple terminal devices according to the capability of supporting frequency domain resources by the terminal devices, and then configure a set of sidelink frequency domain resources for the terminal devices which belong to a same category. Similarly, a certain terminal device can obtain a set of sidelink frequency domain resources corresponding thereto from the broadcast according to its capability of supporting the frequency domain resources, and then select the sidelink frequency domain resource therefrom for the sidelink communication.

Optionally, if the network device configures the sidelink frequency domain resources for the multiple terminal devices, the sidelink frequency domain resources of different terminal devices may completely overlap or partially overlap with each other, or may not overlap with each other. For example, the frequency domain range of the sidelink frequency domain resource of a second terminal device in multiple terminal devices covers the frequency domain range of the sidelink frequency domain resource of a third terminal device in the multiple terminal devices. Optionally, the capability of the second terminal device to support the frequency domain resources may be greater than that of the third terminal device, that is, the frequency domain resources configured for the terminal device that supports a wide range of frequency domain resources can completely cover the frequency domain resources configured for terminal devices that supports a narrow range of frequency domain resources.

Optionally, different frequency domain resources may correspond to different numerologies. For example, the sub-carrier spacing of the different frequency domain resources may be different. The indication information used for indicating the at least one frequency domain resource can also be used for indicating the numerology corresponding to the at least one frequency domain resource. That is, the indication information may indicate a correspondence between the frequency domain resources and the numerologies. After receiving the indication information, the terminal device may select a numerology, and use the frequency domain resource corresponding to the selected numerology among the at least one frequency domain resource as the first frequency domain resource.

Further, the terminal device can select a plurality of frequency domain resources according to the numerologies, and select the first frequency domain resource from the plurality of frequency domain resources in combination with other information. For example, a numerology can be selected, and the frequency domain resources corresponding to the selected numerology can be selected from the at least one frequency domain resource. The plurality of frequency domain resources are selected, that is, one numerology may correspond to the plurality of frequency domain resources, and the terminal device can further determine the first frequency domain resource from the at least one frequency domain resource based on at least one of service information of the terminal device, a correspondence between the frequency domain resource and the service information, and a correspondence between the numerology and the service information.

It should be understood that determining the first frequency domain resource by the terminal device according to the numerology and at least one of the service information of the terminal device, the correspondence between the frequency domain resource and the service information, and the correspondence between the numerology and service information is not particularly restricted in the order. The determining can be performed as in the foregoing process, or the plurality of frequency domain resources can be firstly determined according to the at least one information, and then the first frequency domain resource is determined according to the numerology, which is not limited in the embodiments of the present application. Optionally, the service information includes at least one of a provider service identifier (PSID), a target address, and quality of service (QoS) information.

Alternatively, the terminal device can also directly determine the first frequency domain resource from the at least one frequency domain resource base on at least one of the service information of the terminal device, the correspondence between the frequency domain resource and the service information, and the correspondence between the numerology and the service information. It should be understood that any combination of the information mentioned above can be used in determining the first frequency domain resource.

Optionally, the first frequency domain resource determined by the terminal device can be a transmission frequency domain resource, and the terminal device can further determine whether to perform sidelink transmission on the first frequency domain resource or not. The terminal device can determine whether to perform the sidelink transmission on the first frequency domain resource based on certain principles, including that if it is determined to perform the sidelink transmission on the first frequency domain resource, the terminal device can transmit the sidelink service on the first frequency domain resource, and if it is determined not to perform the sidelink transmission on the first frequency domain resource, the terminal device may not perform the sidelink transmission or sidelink reception on the first frequency domain resource, or the terminal device may not perform the sidelink transmission on the first frequency domain resource but may perform the sidelink reception on the first frequency domain resource.

In the system for Internet of Vehicles, the sidelink services of the terminal device are all transmitted on the uplink resources, and thus the uplink transmission is of a relatively high priority. For example, if there is currently no uplink transmission, the terminal device can determine to perform the sidelink transmission on the first frequency domain resource. Conversely, if there is currently the uplink transmission, the terminal device can determine not to perform the sidelink transmission on the first frequency domain resource. For another example, if there is currently the uplink transmission but the frequency domain resource occupied by the uplink transmission is different from the first frequency domain resource, the first terminal device can determine to perform the sidelink transmission on the first frequency domain resource. By way of example, if the frequency domain resource occupied by the current uplink transmission is of 1~100 MHz, and the first frequency domain resource is of 300~400 MHz, the two do not overlap with each other at all, and at the current moment, both the uplink transmission and the sidelink transmission can be performed. It should be noted that the frequency domain resource occupied by the uplink transmission being different from the first frequency domain resource can include that the two do not overlap in the frequency domain at all, or may partially overlap.

Or, if there is currently no uplink transmission and adjacent uplink transmission is the same in the frequency domain as the first frequency domain resource determined by the terminal device, the terminal device can directly perform the sidelink transmission on the first frequency domain resource without performing switching. If the adjacent uplink transmission is different from the first frequency domain resource determined by the terminal device in the frequency domain, it is necessary for the terminal device to switch the frequency domain resources. If there is not enough time to perform switching at this point, the terminal device will abandon the sidelink transmission on the first frequency domain resource, and if there is enough time to perform the switching, the terminal device can perform the sidelink transmission on the first frequency domain resource. It should be understood that the frequency domain resource occupied by the adjacent uplink transmission may refer to the frequency domain resource occupied by a previous uplink transmission or the frequency domain resource occupied by a next uplink transmission, which is not limited in the embodiments of the present application.

The terminal device can further determine whether to perform the sidelink transmission on the first frequency domain resource in combination with whether the frequency domain resource occupied by the uplink transmission and the first frequency domain resource are within the frequency domain range of the frequency domain resources supported by the terminal device. If they are not within the frequency domain range of the frequency domain resources supported by the terminal device, the sidelink transmission is not performed on the first frequency domain resource. If they are within the frequency domain range of the frequency domain resources supported by the terminal device, the sidelink transmission is performed on the first frequency domain resource.

Figure 4:
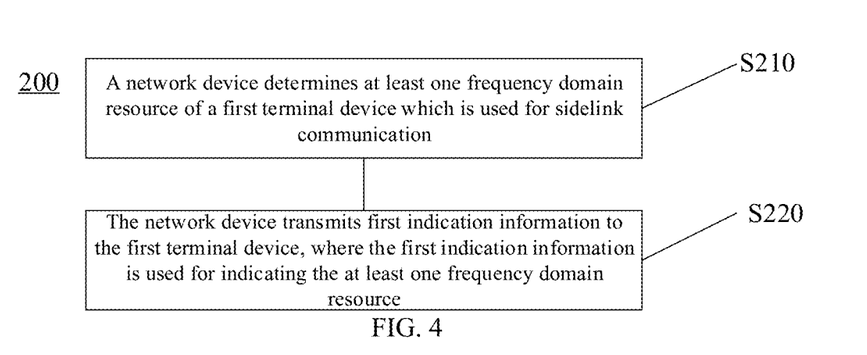
FIG. 4 is a schematic diagram of another sidelink communication method according to an embodiment of the present application.

FIG. 4 is a schematic flowchart of a sidelink communication method 200 according to an embodiment of this application. As shown in FIG. 4, the method 200 includes some or all of the following steps.

In S210, a network device determines at least one frequency domain resource of a first terminal device which is used for sidelink communication.

In S220, the network device transmits first indication information to the first terminal device, where the first indication information is used for indicating the at least one frequency domain resource.

Optionally, in this embodiment of the present application, the method further includes transmitting second indication information to the first terminal device by the network device, where the second indication information is used for indicating a first frequency domain resource in the at least one frequency domain resource.

Optionally, in the embodiment of the present application, the network device determining the at least one frequency domain resource of the first terminal device which is used for sidelink communication includes receiving, by the network device, capability of the frequency domain resources supported by the first terminal device and/or service information of the first terminal device which are reported by the first terminal device, and determining, by the network device, the at least one frequency domain resource according to the capability of the frequency domain resources supported by the first terminal device and/or the service information.

Optionally, in the embodiment of the present application, the service information includes at least one of a provider service identifier (PSID), a target address, and quality of service (QoS) information.

Optionally, in the embodiment of the present application, the first indication information is used for indicating a time-frequency position of each frequency domain resource in the at least one frequency domain resource.

Optionally, in the embodiment of the present application, the first indication information is used for indicating the frequency domain resources for the sidelink communication which are configured for a plurality of terminal devices, and the plurality of terminal devices have the capability to support different frequency domain resources. The plurality of terminal devices include the first terminal device.

Optionally, in the embodiment of the present application, a frequency domain range of the frequency domain resource configured for a second terminal device of the plurality of terminal devices for the sidelink communication covers the frequency domain range of the frequency domain resource configured for a third terminal of the plurality of terminal devices for the sidelink communication, and the capability of the frequency domain resource supported by the second terminal device is greater than the capability of the frequency domain resource supported by the third terminal device.

Optionally, in the embodiment of the present application, the first indication information is further used for indicating a numerology corresponding to the at least one frequency domain resource.

Optionally, in the embodiment of the present application, the frequency domain resource is a bandwidth part (BWP) or a carrier.

It should be understood that interaction between the network device and the terminal device described for the network device and related characteristics and functions correspond to the related characteristics and functions of the terminal device. That is to say, whatever message the terminal device transmits to the network device, the network device receives the corresponding message from the terminal device.

It should also be understood that in the embodiments of the present application, the sequence number of the above-mentioned processes does not mean a performing order, and the performing order of the processes should be determined according to the functions and the internal logic thereof, and should not be limited in the implementations of the embodiments of the present application.

The sidelink communication method according to the embodiments of the present application has been described above in detail. A sidelink communication device according to the embodiments of the present application will be described below in conjunction with FIG. 5 to FIG. 8. The technical features described in the method embodiments are applicable to the following device embodiments.

Figure 5:
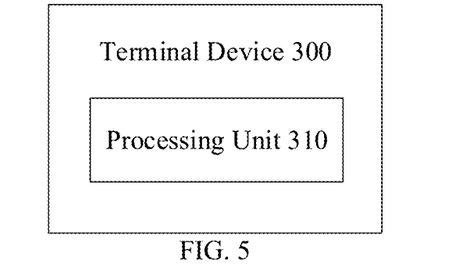
FIG. 5 is a schematic block diagram of a terminal device according to an embodiment of the present application.

FIG. 5 is a schematic block diagram of a terminal device 300 according to an embodiment of the present application. As shown in FIG. 5, the terminal device is a first terminal device, and the terminal device 300 includes:

a processing unit 310 configured to obtain at least one frequency domain resource of the first terminal device which is used for sidelink communication and to determine a first frequency domain resource from the at least one frequency domain resource.

Optionally, in the embodiment of the present application, the processing unit is specifically configured to obtain the at least one frequency domain resource according to a pre-configuration.

Optionally, in the embodiment of the present application, the processing unit is specifically configured to receive first indication information transmitted by a network device, the first indication information being used for indicating the at least one frequency domain resource configured for the first terminal device, and to obtain the at least one frequency domain resource according to the first indication information.

Optionally, in the embodiment of the present application, the processing unit is specifically configured to receive second indication information transmitted by the network device, the second indication information being used for indicating the first frequency domain resource, and to determine, according to the second indication information, the first frequency domain resource from the at least one frequency domain resource indicated by the first indication information.

Optionally, in the embodiment of the present application, the terminal device further includes a transceiver unit configured to report, to the network device, capability of the frequency domain resources supported by the first terminal device and/or service information of the first terminal device.

Optionally, in the embodiment of the present application, the first indication information is used for indicating a time-frequency position of each frequency domain resource in the at least one frequency domain resource.

Optionally, in the embodiment of the present application, the first indication information is used for indicating the frequency domain resources for the sidelink communication which are configured for a plurality of terminal devices, the plurality of terminal devices have the capability to support different frequency domain resources, and the plurality of terminal devices include the first terminal device.

Optionally, in the embodiment of the present application, a frequency domain range of the frequency domain resource configured for a second terminal device of the plurality of terminal devices for the sidelink communication covers the frequency domain range of the frequency domain resource configured for a third terminal of the plurality of terminal devices for the sidelink communication, and the capability of the frequency domain resource supported by the second terminal device is greater than the capability of the frequency domain resource supported by the third terminal device.

Optionally, in the embodiment of the present application, the first indication information is further used for indicating a numerology corresponding to the at least one frequency domain resource.

Optionally, in the embodiment of the present application, the processing unit is specifically configured to determine the first frequency domain resource from the at least one frequency domain resource according to the numerologies corresponding to the different frequency domain resources.

Optionally, in the embodiment of the present application, the processing unit is specifically configured to determine the first frequency domain resource from the at least one frequency domain resource according to the numerologies corresponding to the different frequency domain resources and at least one of service information of the first terminal device, a correspondence between the frequency domain resource and the service information and a correspondence between the numerology and the service information.

Optionally, in the embodiment of the present application, the service information includes at least one of a provider service identifier (PSID), a target address, and quality of service (QoS) information.

Optionally, in the embodiment of the present application, the first frequency domain resource is a transmission frequency domain resource.

Optionally, in the embodiment of the present application, the processing unit is further configured to determine whether to perform sidelink transmission on the first frequency domain resource or not.

Optionally, in the embodiment of the present application, the processing unit is specifically configured to determine to perform the sidelink transmission on the first frequency domain resource when there is currently no uplink transmission.

Optionally, in the embodiment of the present application, there is enough time to switch the frequency domain resources between the current sidelink transmission and the adjacent uplink transmission.

Optionally, in the embodiment of the present application, the processing unit is specifically configured to determine to perform the sidelink transmission on the first frequency domain resource when there is currently uplink transmission and the frequency domain resource occupied by the uplink transmission is different from the first frequency domain resource.

Optionally, in the embodiment of the present application, the frequency domain resource occupied by the uplink transmission and the first frequency domain resource are within the frequency domain range of the frequency domain resource supported by the first terminal device.

Optionally, in the embodiment of the present application, the frequency domain resource is a bandwidth part (BWP) or a carrier.

It should be understood that the terminal device 300 according to the embodiment of the present application can correspond to the terminal device in the method embodiments of the present application, and the above-mentioned and other operations and/or functions of the units in the terminal device 300 are used to implement the process for the first terminal device in method as shown in FIG. 3. For the sake of brevity, it will not be repeated here.

Figure 6:
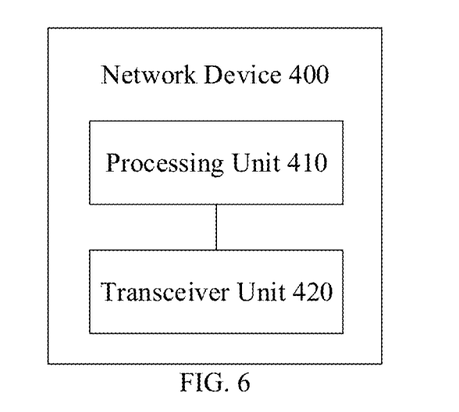
FIG. 6 is a schematic block diagram of a network device according to an embodiment of the present application.

FIG. 6 is a schematic block diagram of a network device 400 according to an embodiment of the present application. As shown in FIG. 6, the network device 400 includes:

a processing unit 410 configured to determine at least one frequency domain resource of a first terminal device which is used for sidelink communication; and a transceiver unit 420 configured to transmit first indication information to the first terminal device, where the first indication information is used for indicating the at least one frequency domain resource.

Optionally, in the embodiment of the present application, the transceiver unit is further configured to transmit second indication information to the first terminal device, where the second indication information is used for indicating a first frequency domain resource of the at least one frequency domain resource.

Optionally, in the embodiment of the present application, the processing unit is specifically configured to: receive capability of the frequency domain resource supported by the first terminal device and/or service information of the first terminal device which are reported by the first terminal device; and to determine the at least one frequency domain resource according to the capability of the frequency domain resource supported by the first terminal device and/or the service information.

Optionally, in the embodiment of the present application, the service information includes at least one of a provider service identifier (PSID), a target address, and quality of service (QoS) information.

Optionally, in the embodiment of the present application, the first indication information is used for indicating a time-frequency position of each frequency domain resource in the at least one frequency domain resource.

Optionally, in the embodiment of the present application, the first indication information is used for indicating the frequency domain resources for the sidelink communication which are configured for a plurality of terminal devices, the plurality of terminal devices have capability to support different frequency domain resources, and the plurality of terminal devices include the first terminal device.

Optionally, in the embodiment of the present application, a frequency domain range of the frequency domain resource configured for a second terminal device of the plurality of terminal devices for the sidelink communication covers the frequency domain range of the frequency domain resource configured for a third terminal of the plurality of terminal devices for the sidelink communication, and the capability of the frequency domain resource supported by the second terminal device is greater than the capability of the frequency domain resource supported by the third terminal device.

Optionally, in the embodiment of the present application, the first indication information is further used for indicating a numerology corresponding to the at least one frequency domain resource.

Optionally, in the embodiment of the present application, the frequency domain resource is a bandwidth part (BWP) or a carrier.

It should be understood that the network device 400 according to the embodiment of the present application can correspond to the network device in the method embodiments of the present application, and the above-mentioned and other operations and/or functions of the units in the network device 400 are used to implement the corresponding processes of the network device in the method as shown in FIG. 4. For the sake of brevity, it will not be repeated here.

Figure 7:
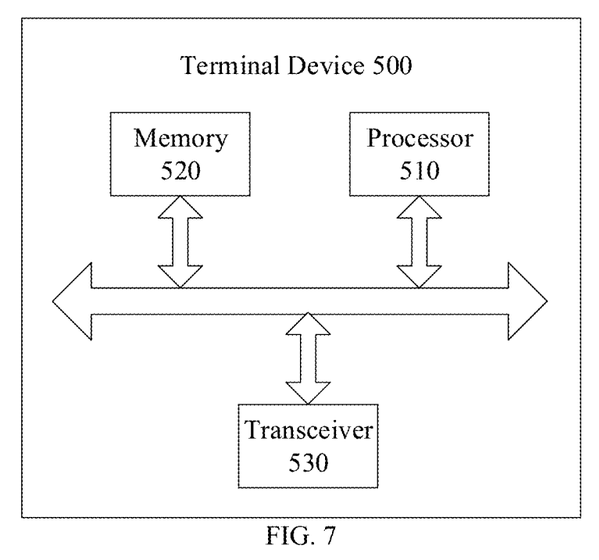
FIG. 7 is a schematic block diagram of another terminal device according to an embodiment of the present application.

As shown in FIG. 7, the embodiments of the present application also provide a terminal device 500. The terminal device 500 can be the terminal device 300 shown in FIG. 5, which can be used to perform the operations of the first terminal device corresponding to the method 100 shown in FIG. 3. The terminal device 500 shown in FIG. 7 includes a processor 510 which can invoke and run a computer program from a memory to implement the methods in the embodiments of the present application.

Optionally, as shown in FIG. 7, the terminal device 500 can further include a memory 520. The processor 510 can invoke and run the computer program from the memory 520 to implement the methods in the embodiments of the present application.

The memory 520 can be a separate device independent of the processor 510, or can be integrated in the processor 510.

Optionally, as shown in FIG. 7, the terminal device 500 can further include a transceiver 530, and the processor 510 can control the transceiver 530 to communicate with other devices. Specifically, it can transmit information or data to other devices, or receive information or data transmitted from other devices.

The transceiver 530 can include a transmitter and a receiver. The transceiver 530 can further include one or more antennas.

Optionally, the terminal device 500 can be the terminal device in the embodiments of the present application, and the terminal device 500 can implement the corresponding processes implemented by the terminal device in the methods according to the embodiments of the present application. For the sake of brevity, it will not be repeated herein.

In a specific implementation, the processing unit in the terminal device 500 can be implemented by the processor 510 shown in FIG. 7. The transceiver unit in the terminal device 500 can be implemented by the transceiver 530 shown in FIG. 7.

Figure 8:
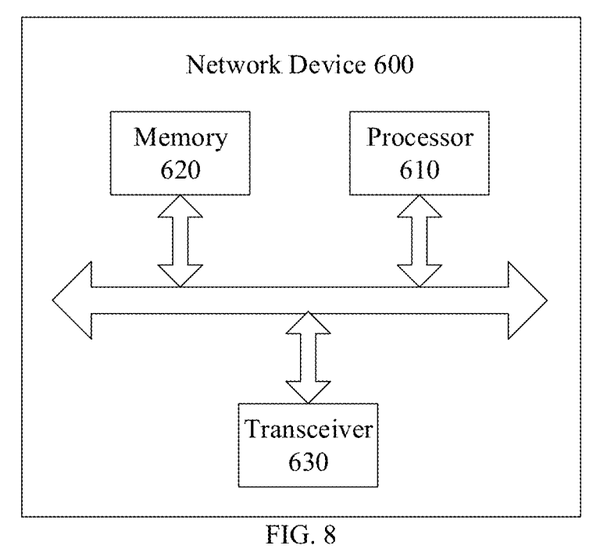
FIG. 8 is a schematic block diagram of another network device according to an embodiment of the present application.

As shown in FIG. 8, the embodiments of the present application also provide a network device 600. The network device 600 can be the network device 400 shown in FIG. 6, which can be used to perform the operations of the network device corresponding to the method 200 shown in FIG. 4.

The network device 600 shown in FIG. 8 includes a processor 610 which can invoke and run a computer program from a memory to implement the methods in the embodiments of the present application.

Optionally, as shown in FIG. 8, the network device 600 can further include a memory 620. The processor 610 can invoke and run the computer program from the memory 620 to perform the methods in the embodiments of the present application.

The memory 620 can be a separate device independent of the processor 610, or can be integrated in the processor 610.

Optionally, as shown in FIG. 8, the network device 600 can further include a transceiver 630, and the processor 610 can control the transceiver 630 to communicate with other devices. Specifically, it can transmit information or data to other devices, or receive information or data transmitted from other devices.

The transceiver 630 can include a transmitter and a receiver. The transceiver 630 can further include one or more antennas.

Optionally, the network device 600 can specifically be the network device in the embodiments of the present application, and the network device 600 can implement the corresponding processes which are implemented by the network device in the methods of the embodiments of the present application. For the sake of brevity, a repeated description is omitted here.

In a specific implementation, the processing unit in the network device 600 can be implemented by the processor 610 shown in FIG. 8. The transceiver unit in the network device 600 can be implemented by the transceiver 630 shown in FIG. 8.

Figure 9:
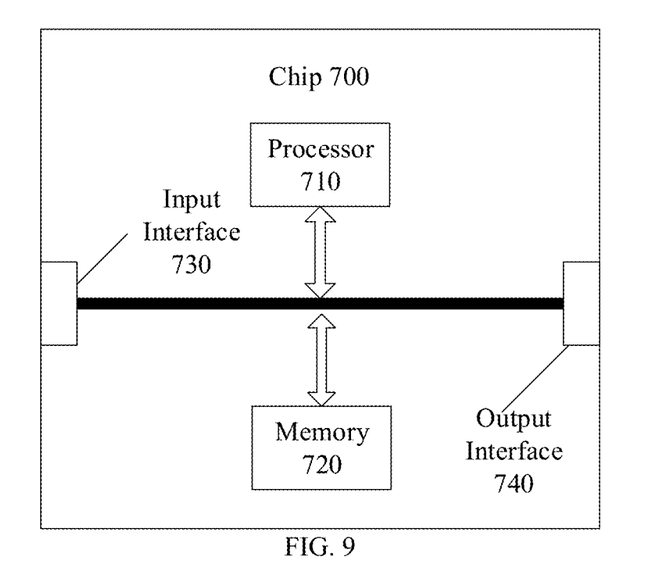
FIG. 9 is a schematic block diagram of a chip according to an embodiment of the present application.

FIG. 9 is a schematic structural diagram of a chip according to an embodiment of the present application. The chip 700 shown in FIG. 9 includes a processor 710 which can invoke and run a computer program from a memory to implement the methods in the embodiments of the present application.

Optionally, as shown in FIG. 9, the chip 700 can further include a memory 720. The processor 710 can invoke and run the computer program from the memory 720 to implement the methods in the embodiments of the present application.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the network device in the embodiments of the present application, and can implement the corresponding processes which are implemented by the network device in the methods of the embodiments of the present application. For the sake of brevity, a repeated description will be omitted here.

Optionally, the chip can be applied to the terminal device in the embodiments of the present application, and can implement the corresponding processes which are implemented by the terminal device in the methods of the embodiments of the present application. For the sake of brevity, a repeated description will be omitted here.

It should be understood that the chip mentioned in the embodiments of the present application can also be referred to as a system-level chip, a system chip, a chip system, or a system-on-chip.

Figure 10:
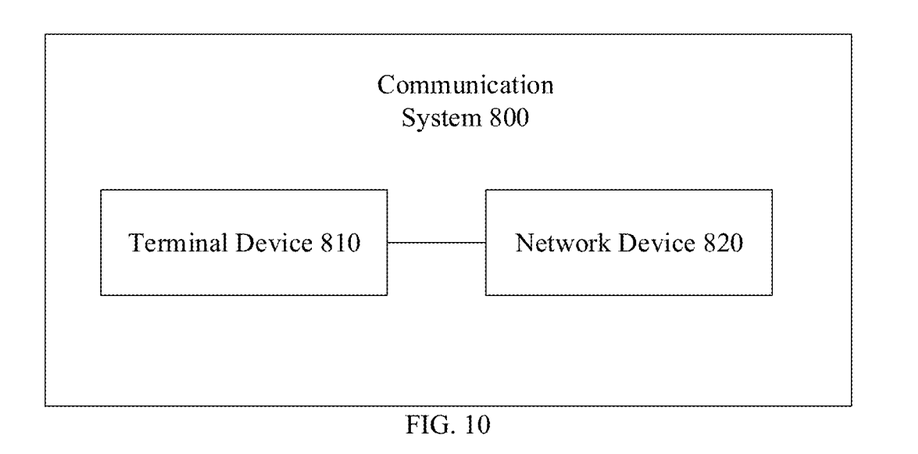
FIG. 10 is a schematic block diagram of a communication system according to an embodiment of the present application.

FIG. 10 is a schematic block diagram of a communication system 800 according to an embodiment of the present application. As shown in FIG. 10, the communication system 800 includes a terminal device 810 and a network device 820.

The terminal device 810 can be used to implement the corresponding functions implemented by the terminal device in the above methods, and the network device 820 can be used to implement the corresponding functions implemented by the network device in the above methods. For the sake of brevity, a repeated description is omitted here.

It should be understood that the processor of the embodiment of the present application can be an integrated circuit chip with signal processing capability. In the implementations, the steps of the foregoing method embodiments can be performed by an integrated logic circuit of hardware in the processor or instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component. The methods, steps, and logical blocks disclosed in the embodiments of the present disclosure can be implemented or performed. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, various forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memory in the systems and methods described herein is intended to include, but is not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present application also provide a computer-readable storage medium for storing a computer program.

Optionally, the computer-readable storage medium can be applied to the network device in the embodiments of the present application, and the computer program causes a computer to perform the corresponding processes which are implemented by the network device in the methods of the embodiments of the present application. For the sake of brevity, a repeated description is omitted here.

Optionally, the computer-readable storage medium can be applied to the terminal device in the embodiments of the present application, and the computer program causes the computer to perform the corresponding processes which are implemented by the mobile terminal/terminal device in the methods of the embodiments of the present application. For the sake of brevity, a repeated description is omitted here.

The embodiments of the present application also provide a computer program product including computer program instructions.

Optionally, the computer program product can be applied to the network device in the embodiments of the present application, and the computer program instructions cause a computer to perform the corresponding processes which are implemented by the network device in the methods of the embodiments of the present application. For the sake of brevity, a repeated description is omitted here.

Optionally, the computer program product can be applied to the terminal device in the embodiments of the present application, and the computer program instructions cause a computer to perform the corresponding processes which are implemented by the mobile terminal/terminal device in the methods of the embodiments of the present application. For the sake of brevity, a repeated description is omitted here.

The embodiments of the application also provide a computer program.

Optionally, the computer program can be applied to the network device in the embodiments of the present application, and when running on a computer, the computer program causes the computer to perform the corresponding processes which are implemented by the network device in the methods of the embodiments of the present application. For the sake of brevity, a repeated description is omitted here.

Optionally, the computer program can be applied to the terminal device in the embodiments of the present application, and when running on a computer, the computer program causes the computer to perform the corresponding processes implemented by the terminal device in the methods of the embodiments of the present application. For the sake of brevity, a repeated description is omitted here.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific application of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present disclosure, it should be understood that the systems, devices, and methods disclosed can be implemented in other manners. For example, the device embodiments described above are merely illustrative. For example, the division of the units is only a logical function division, and in actual implementations, there can be other division manners. By way of example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into a processing unit, or can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be defined by the claims.

What is claimed is:

1. A sidelink communication method, comprising:
    obtaining, by a first terminal device, a plurality of frequency domain resources of the first terminal device which are used for sidelink communication; and
    determining, by the first terminal device, a first frequency domain resource from the plurality of frequency domain resources,
    wherein obtaining, by the first terminal device, the plurality of frequency domain resources of the first terminal device which are used for the sidelink communication comprises:
        receiving, by the first terminal device, first indication information transmitted by a network device, the first indication information being used for indicating the plurality of frequency domain resources configured for the first terminal device; and
        obtaining the plurality of frequency domain resources by the first terminal device according to the first indication information,
    wherein the first indication information is used for indicating the frequency domain resources for the sidelink communication which are configured for a plurality of terminal devices, the plurality of terminal devices have capability of supporting different frequency domain resources, and the plurality of terminal devices include the first terminal device.

2. The method according to claim 1, wherein obtaining, by the first terminal device, the plurality of frequency domain resources of the first terminal device which are used for the sidelink communication comprises:
    obtaining the plurality of frequency domain resources by the first terminal device according to a pre-configuration.

3. The method according to claim 1, wherein determining, by the first terminal device, the first frequency domain resource from the plurality of frequency domain resources comprises:
    receiving, by the first terminal device, second indication information transmitted by the network device, the second indication information being used for indicating the first frequency domain resource; and
    determining, by the first terminal device according to the second indication information, the first frequency domain resource from the plurality of frequency domain resources indicated by the first indication information.

4. The method according to claim 1, wherein prior to receiving the first indication information by the first terminal device, the method further comprises:
    reporting, by the first terminal device to the network device, capability of the frequency domain resource supported by the first terminal device and/or service information of the first terminal device.

5. The method according to claim 4, wherein the service information includes at least one of a provider service identifier (PSID), a target address, and quality of service (QoS) information.

6. The method according to claim 1, wherein the first indication information is used for indicating a time-frequency position of each frequency domain resource in the plurality of frequency domain resources.

7. The method according to claim 1, wherein a frequency domain range of the frequency domain resources for the sidelink communication which are configured for a second terminal device of the plurality of terminal devices covers the frequency domain range of the frequency domain resources for the sidelink communication which are configured for a third terminal device of the plurality of terminal devices, and the capability of the frequency domain resources supported by the second terminal device is greater than the capability of the frequency domain resources supported by the third terminal device.

8. The method according to claim 7, wherein the first indication information is further used for indicating a numerology corresponding to the plurality of frequency domain resources.

9. The method according to claim 8, wherein determining, by the first terminal device, the first frequency domain resource from the plurality of frequency domain resources comprises:
   determining, by the first terminal device according to the numerologies corresponding to the different frequency domain resources, the first frequency domain resource from the plurality of frequency domain resources.

10. The method according to claim 9, wherein determining, by the first terminal device according to the numerologies corresponding to the different frequency domain resources, the first frequency domain resource from the plurality of frequency domain resources comprises:
   determining, by first terminal device, the first frequency domain resource from the plurality of frequency domain resources according to the numerologies corresponding to the different frequency domain resources and at least one of service information of the first terminal device, a correspondence between the frequency domain resource and the service information, and a correspondence between the numerology and the service information.

11. The method according to claim 1, wherein the first frequency domain resource is a transmission frequency domain resource.

12. The method according to claim 11, further comprising:
   determining, by the first terminal device, whether to perform the sidelink transmission on the first frequency domain resource or not.

13. The method according to claim 12, wherein determining, by the first terminal device, whether to perform the sidelink transmission on the first frequency domain resource or not comprises:
   determining, by the first terminal device, to perform the sidelink transmission on the first frequency domain resource when there is currently no uplink transmission.

14. The method according to claim 13, wherein there is enough time to switch the frequency domain resources between current sidelink transmission and adjacent uplink transmission.

15. The method according to claim 12, wherein determining, by the first terminal device, whether to perform the sidelink transmission on the first frequency domain resource or not comprises:
   determining, by the first terminal device, to perform the sidelink transmission on the first frequency domain resource when there is currently uplink transmission and the frequency domain resource occupied by the uplink transmission is different from the first frequency domain resource.

16. The method according to claim 15, wherein the frequency domain resource occupied by the uplink transmission and the first frequency domain resource are within a frequency domain range of the frequency domain resource supported by the first terminal device.

17. A terminal device comprising a processor and a memory for storing a computer program, wherein the processor is configured to run the computer program stored in the memory to perform the method according to claim 1.

18. A computer-readable storage medium for storing a computer program that causes a computer to perform the method according to claim 1.

* * * * *